(12) United States Patent
Strumolo et al.

(10) Patent No.: US 6,535,242 B1
(45) Date of Patent: Mar. 18, 2003

(54) SYSTEM AND METHOD FOR ACQUIRING AND DISPLAYING VEHICULAR INFORMATION

(76) Inventors: Gary Steven Strumolo, 18910 Hillcrest, Beverly Hills, MI (US) 48025; Ronald Hugh Miller, 827 Berkshire Dr., Saline, MI (US) 48176

(*) Notice: Subject to any disclaimer, the term of this patent is extended or adjusted under 35 U.S.C. 154(b) by 357 days.

(21) Appl. No.: 09/695,646

(22) Filed: Oct. 24, 2000

(51) Int. Cl.[7] .................................................. H04N 7/18
(52) U.S. Cl. ........................... 348/148; 348/42; 701/28
(58) Field of Search ........................... 348/42, 147, 148; 701/28; H04N 7/18

(56) References Cited

U.S. PATENT DOCUMENTS 5,410,346 A * 4/1995 Saneyoshi et al. .......... 348/148
5,530,420 A * 6/1996 Tsuchiya et al. ............. 348/42
6,396,397 B1 * 5/2002 Bos et al. ...................... 348/42

* cited by examiner

Primary Examiner—Howard Britton

(57) ABSTRACT

An image acquisition and display system 10 is provided for use on a vehicle. System 10 includes a three-dimensional display and two stereo camera pairs 18, 20 and 22, 24 which are respectively mounted on the driver-side and passenger-side of the vehicle. Camera pairs 18, 20 and 22, 24 are adapted to receive images of objects located in the front of the vehicle from both sides of the vehicle regardless of the ambient light level surrounding the vehicle. A controller 14 processes the image data from cameras 18–24 and provides three-dimensional image data to display 12 which utilizes the data to display the images to the driver 52 in a three-dimensional format. A user input device 26 allows a driver 52 of the vehicle to select between camera pairs 18, 20 and 22, 24, to reposition camera pairs 18, 20 and 22, 24, and to selectively magnify and minimize images acquired by cameras pairs 18,20 and 22,24.

20 Claims, 1 Drawing Sheet

SYSTEM AND METHOD FOR ACQUIRING AND DISPLAYING VEHICULAR INFORMATION

FIELD OF THE INVENTION

This invention generally relates to a system and method for acquiring and displaying vehicular information and more particularly, to a system and a method which is adapted for use within a vehicle and which selectively acquires and displays three-dimensional images of objects and/or of a portion of the environment surrounding the vehicle.

BACKGROUND OF THE INVENTION

It is desirable to provide a driver of a vehicle with as much relevant information describing the area surrounding the vehicle as possible. Traditionally, mirrors, lights and windows are used within and/or upon a vehicle to provide images of objects and/or of a portion of the environment located around the vehicle (e.g., disposed in front the vehicle).

While such traditional devices allow the driver to view certain objects and/or portions of the environment in which the vehicle resided, they do not substantially allow for the acquisition and the display of images of objects and/or of the ambient vehicular environment located and/or disposed along the front of the vehicle. Additionally, these devices force drivers to turn their heads and/or alter their field of vision to view the areas surrounding the vehicle. As such, these devices force drivers to frequently take their eyes off the road to observe their surroundings, thereby undesirably increasing the risk of an accident. Furthermore, these devices fail to provide the driver with information concerning the complete surroundings of the vehicle, and often result in a number of undesirable "blind spots" or areas around the vehicle which cannot be observed by the driver.

Other efforts at vehicle image acquisition and display include the use of one or more cameras which provide images of areas and/or objects around the vehicle. While systems using conventional cameras provide additional information to the driver, they do not provide the user with three-dimensional data which could be used by the driver to determine the spatial orientation of objects in front of the vehicle. Moreover, because these systems lack "depth perception" they are not able to timely and accurately warn the driver of potential hazards.

There is therefore a need for a new and improved vehicular image acquisition and display system which overcomes at least some of the previously delineated drawbacks of prior systems.

SUMMARY OF THE INVENTION

A first advantage of the invention is that it provides a system and method for acquiring and displaying vehicular information which overcomes many, if not all, of the previously delineated drawbacks of the prior systems, devices and/or methods.

A second advantage of the invention is that it provides a system and method for acquiring and displaying vehicular information which is effective to obtain and display three-dimensional information describing the areas surrounding the vehicle.

A third advantage of the invention is that it provides an information display system which utilizes cameras having infrared illuminators to obtain image information in front of the vehicle when the ambient light level outside of the vehicle is relatively low.

A fourth advantage of the invention is that it provides an information display system for a vehicle which includes stereoscopic cameras which are mounted to extremities of the vehicle (e.g., on the side mirrors of the vehicle) and which enable stereo visioning in front of the vehicle from both sides of the vehicle.

According to one aspect of the present invention, an image acquisition and display system is provided for use with a vehicle. The system includes a first stereo camera pair which is mounted on a driver-side of the vehicle and which is effective to acquire and transmit first three-dimensional image data; a second stereo camera pair which is mounted on a passenger-side of the vehicle and which is effective to acquire and transmit second three-dimensional image data; a controller which is communicatively coupled to the first and second stereo camera pairs and which is effective to receive and process the first and second three-dimensional image data and to transmit a signal representing the processed image data; and a three-dimensional display assembly which is communicatively coupled to the controller and which is effective to receive the signal and to display the processed image data in a three-dimensional format.

According to a second aspect of the present invention, a method is provided for acquiring and displaying images for use with a vehicle. The method includes the steps of providing a three-dimensional display; mounting the display within the vehicle; providing a first and a second stereo camera pair; mounting the first stereo camera pair on a driver-side of the vehicle; mounting the second stereo camera pair on a passenger-side of the vehicle; selectively acquiring images from the first and the second stereo camera pair; and selectively displaying the acquired images in a three-dimensional format on the display.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
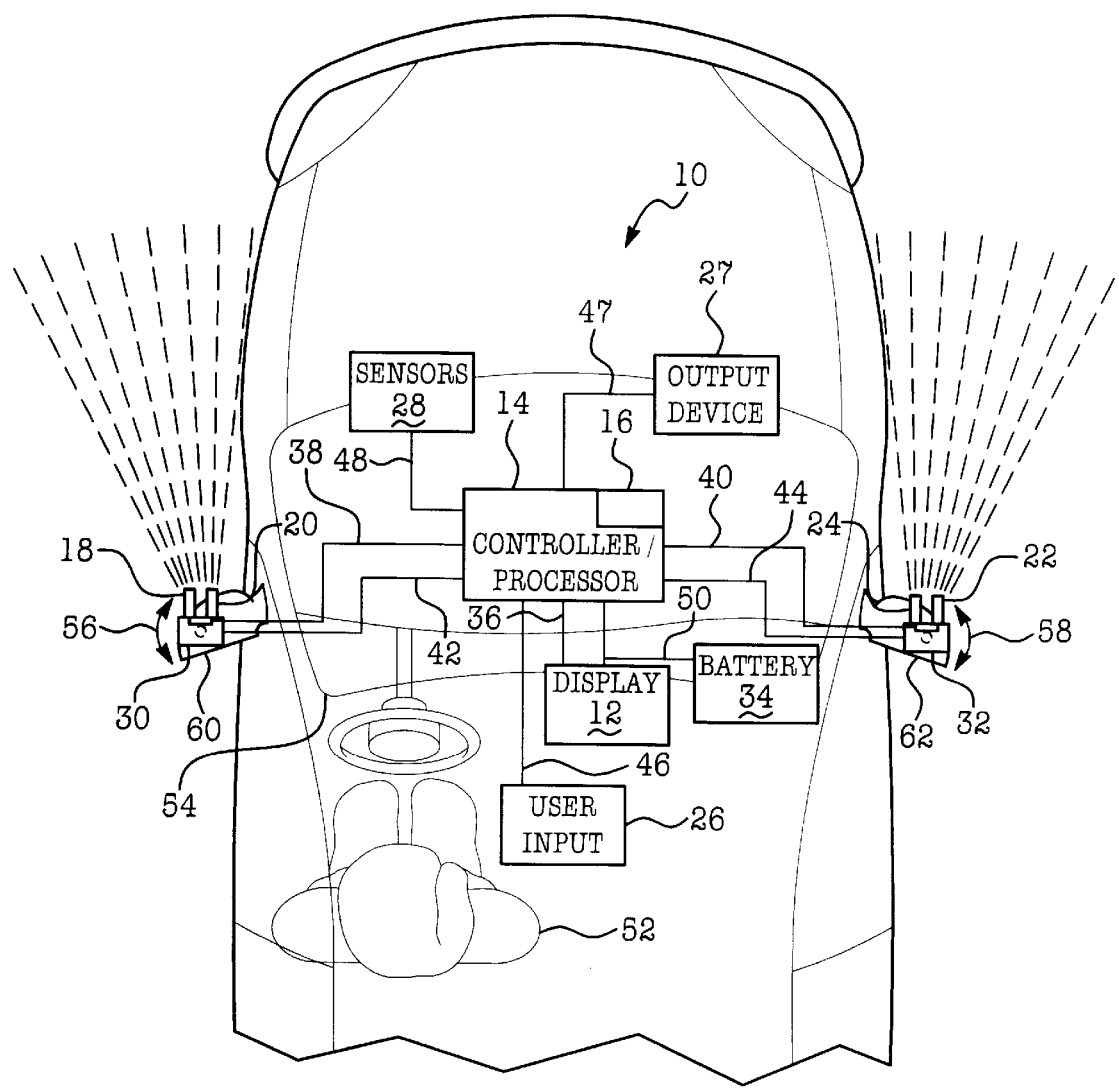
FIG. 1 is a block diagram of a system for acquiring and displaying vehicle information which incorporates the teachings of the preferred embodiment of the invention.

Referring now to FIG. 1, there is shown an information acquisition and display system 10 for use with a vehicle and which is made in accordance with the teachings of the preferred embodiment of the invention. As shown, system 10 includes an illuminated, three-dimensional or auto-stereoscopic screen or display assembly 12, a conventional processor and/or controller 14 having a memory unit 16 and operating under stored program control, stereo camera pairs 18, 20 and 22, 24 which are respectively and operatively coupled to camera positioning assemblies 30, 32, a user input device 26, an output device 27, and vehicle sensors 28.

Controller 14 is electrically, physically, and communicatively coupled to display assembly 12 by bus 36, to camera pairs 18, 20 and 22, 24 by busses 38, 40, respectively, to camera motor assemblies 30, 32 by busses 42, 44, respectively, to user input 26 by way of bus 46, to output device 27 by way of bus 47, and to vehicle sensors 28 way of bus 48. Controller 14 and display assembly 12 are further physically and electrically coupled to a source of electrical power or battery 34 by use of power bus 50, which selectively provides electrical power to controller 14 and display assembly 12.

In the preferred embodiment of the invention, display assembly 12 is a conventional and commercially available illuminated, three-dimensional display device, such as and without limitation the three-dimensional display device which is described within U.S. patent application Ser. No. 09/370,155, which is assigned to the present assignee and which is fully and completely incorporated herein by reference. In one non-limiting embodiment, display assembly 12 comprises a commercially available model "DTI Virtual Window" display assembly which is available from Dimension Technologies, Inc. of Rochester, N.Y. In other alternate embodiments, different types of three-dimensional displays can be used such as laser or holographic displays or three-dimensional flat panel displays. Assembly 12 is effective to display images to a driver 52 with three-dimensional and/or "depth" information, which allows driver 52 to easily ascertain the proximity of the displayed objects relative to the vehicle and relative to each other. Display assembly 12 is preferably mounted within the passenger compartment of the vehicle in a position which allows the driver 52 to easily view the display. In the preferred embodiment, display assembly 12 is mounted on and/or forms a portion of the vehicle instrument panel or dashboard 54. In the case of laser or holographic type displays, display 12 may be projected directly onto the windshield or within the driver's field of view. In this manner, the driver is not required to turn his or her "line of vision" substantially away from the road to view the display assembly 12.

Controller 14 comprises one or more conventional processors, microprocessors and/or microcontrollers, operating under stored program control. Memory 16 is a conventional memory unit including both permanent and temporary memory, and is adapted to and does store at least a portion of the operating software which directs the operation of controller 14. Moreover, memory 16 is also adapted to selectively store other types of data or information, including information associated with the operation of the preferred embodiment of the invention and/or associated processing data, image data, and operational data. As should also be apparent to those of ordinary skill in the art, controller 14 and memory 16 may actually comprise a plurality of commercially available, conventional, and disparate chips or devices which are operatively and communicatively linked in a cooperative manner. For example, controller 14 may comprise one or more camera processors, motor controllers, vehicle system controllers, and/or display processors. In the preferred embodiment, controller/processor 14 further includes voice, pattern and image recognition software, hardware and/or firmware which may include integrated multi-phase algorithms, neural networks, fuzzy logic and other image/voice processing tools.

Camera pairs 18, 20 and 22, 24 comprise commercially available stereoscopic "CMOS" type cameras having infrared illuminators which enable stereo vision regardless of the ambient light level surrounding the vehicle (i.e., during the day, at night and in fog conditions). In the preferred embodiment, camera pair 18, 20 and pair 22, 24 are each able to acquire images of objects which are located one hundred feet or more in front of the vehicle. Particularly, camera pairs 18, 20 and 22, 24 are each adapted to respectively acquire images of the portions of the ambient vehicular environment and/or of objects which are positioned in front of the vehicle (i.e., in front of driver 52) from each side of the vehicle. Particularly, cameras 18–24 acquire such object images by use of conventional lenses that receive light rays that "reflect off" of the detected objects. Camera pairs 18, 20 and 22, 24 are respectively mounted on camera positioning assemblies 30, 32 which comprise selectively rotatable, electronically controlled motor assemblies. In the preferred embodiment motor assemblies 30, 32 and camera pairs 18, 20 and 22, 24 are respectively mounted on or within vehicle mirror shrouds or covers 60, 62. In other alternate embodiments, camera pairs 18, 20 and 22, 24 can be mounted to other structures that are coupled to and/or form the extremities of the driver and passenger sides of the vehicle. Each motor assembly 30, 32 is effective to receive signals from controller 14 and to selectively rotate camera pairs 18, 20 and 22, 24 in the directions of arrows 56, 58, and to selectively pivot camera pairs 18, 20 and 22, 24 upward and downward.

User input device 26 is a conventional and commercially available input device such as a selectively positionable switch, a series of buttons, a keyboard, a touch pad, a microphone and voice recognition system or any other conventional and commercially available device suitable to permit a user, typically the driver or passenger of the vehicle, to enter data and/or commands into controller 14. As discussed more fully and completely below, these commands allow a user to switch between camera pair 18, 20 and camera pair 22, 24 and to perform other imaging functions.

In the preferred embodiment, output device 27 comprises a conventional audio and/or visual output device, such as a light or speaker which allows for the selective transmission of audible and/or visual warning signals to driver 52.

Vehicle sensors 28 comprise a plurality of conventional and commercially available sensors which measure certain information pertaining to vehicle attributes/characteristics (e.g., vehicle speed, engine speed, direction of vehicle travel, engine temperature, turning radius, vehicle acceleration, yaw rate, and other vehicle attributes) and which provide the measured attribute data to controller 14. Sensors 28 may also include one or more "surrounding area" sensors which are disposed within, on and/or around the vehicle and which measure certain information pertaining to the areas and/or environment external to or surrounding the vehicle, including but not limited to the location, attributes and spatial orientation of objects located around the vehicle and the level of ambient light surrounding the vehicle. For example and without limitation, sensors 28 may include conventional radar, laser, ultrasound, acoustical, and infrared sensors for measuring information such as the location, size, shape, speed, range, and direction of travel of objects located within a certain distance of the vehicle (e.g., other cars, barriers, walls, trees, rocks, pedestrians, animals, and street lights). This information may be used along with data received from cameras 18–24 to assist in image and pattern recognition and depth display.

In operation, driver 52 or another operator can selectively activate cameras pair 18, 20 or camera pair 22, 24 by use of input device 26. In the preferred embodiment of the invention, input device 26 allows a user to select between the driver-side cameras 18, 20 and the passenger-side cameras 22, 24. Particularly, a user may either verbally (i.e., in the case of a voice recognition input device) or manually (i.e., in the case of a switch, keyboard or other manual input device) command input device 26 to activate camera pair 18, 20 or camera pair 22, 24. The selected camera pair 18, 20 or 22, 24 provides three-dimensional image data to controller 14 which processes the data before communicating signals to display assembly 12 which utilizes the signals to provide the driver 52 with a three-dimensional representation of the objects within the field of view of the activated camera pair.

In this manner, a user may select between stereo-imaging from each side of the vehicle, thereby allowing the user to see up-coming road conditions and potential hazards from both "sides of traffic" with proper depth cues. Due to the location of camera pairs 18, 20 and 22, 24 at the extremities of the vehicle, system 10 effectively allows a user to "see around" traffic (i.e. other vehicles) in front of the vehicle. A user may also use input device 26 to cause camera pairs 18, 20 and 22, 24 to alter the field of view of each camera pair 18, 20 and pair 22, 24. Particularly, when controller 14 receives positioning commands from input device 26, controller 14 transmits signals to the motor assembly 30 or 32 that corresponds to the selected camera pair (e.g., pair 18, 20 or pair 22, 24). The selected motor assembly 30, 32 receives the signals and rotates and/or pivots the camera pair 18, 20 or 22, 24 in the desired manner. Camera pairs 18, 20 and 22, 24 include software (e.g., image processing) and/or hardware (e.g., telescopic lenses) zooming capabilities which may be selectively activated in a similar manner (e.g., by verbal or manual commands) and which allow a user to selectively magnify and minimize images acquired by the camera pairs 18, 20 and 22, 24. It should be appreciated that a driver 52 can use the positioning and zooming capabilities of cameras 18–24 to easily identify objects and read street signs which are located relatively remote from the vehicle by use of a series of manual and/or verbal commands.

In one non-limiting embodiment, an operator may use input device 26 and controller 14 to selectively activate a unique one of camera pair 18, 20 and a unique one of camera pair 22, 24 and to use the activated cameras in combination to increase the viewing range of system 10. For example and without limitation, an operator may select to use the outer-most cameras 18 and 22 in combination as a stereo pair in order to increase the resolution of objects/images far away from the vehicle. Particularly, using the remotely spaced cameras 18 and 22 as a stereo pair allows the focal point of the cameras to be moved relatively far in front of the vehicle, thereby providing improved resolution and imaging of remote objects.

In the preferred embodiment, controller 14 utilizes its pattern and image recognition software along with the data received from camera pair 18, 20 or 22, 24 to determine the nature or identity of the objects within the field of view of the selected camera pair 18, 20 or 22, 24 (e.g., other cars, barriers, walls, trees, rocks, pedestrians, animals, and street lights). Controller 14 may also use data received from surrounding area sensors 28 to assist in object identification. In the preferred embodiment, the pattern and image recognition software resident within controller 14 is effective to identify objects, letters and words, (e.g., the identity of vehicles, pedestrians and other objects, and the names of streets, letters and numbers that are printed on signs), and to audibly or visually notify the driver of the identity of such objects and/or words (e.g., by use of display 12 and/or output device 27). Particularly, the pattern and image recognition software, hardware and/or firmware (e.g., the integrated multi-phase algorithms, neural networks, fuzzy logic and/or other image processing tools) enables the system 10 to provide accurate image recognition of people, signs and other visually important material even in conditions of poor contrast, lighting and reflection.

In one non-limiting embodiment, display assembly 12 provides an iconographic representation of the identified objects with proper depth cues, and illustrates the spatial orientation of the identified objects relative to the vehicle and relative to each other. In the preferred embodiment of the invention, the shape of the object will determine the type of symbol or icon used; the relative size of an object will determine the size of the symbol or icon; the range of the object will determine the location of the icon on the display; and special attributes of the object (e.g., stationary, relatively high velocity, erratic heading and collision potential) may be used to modify the icon or to provide other visual and/or audible warnings to the driver of a potential concern or hazard.

In the preferred embodiment, the infrared illuminators of camera pairs 18, 20 and 22, 24 are automatically activated when the ambient light level surrounding the vehicle falls below a certain predetermined level. Particularly, controller 14 monitors sensors 28 to determine the ambient light level surrounding the vehicle, and when the measured level falls below a predetermined threshold, controller 14 transmits signals to cameras 18, 20 and 22, 24, effective to activate the respective illuminators, thereby enabling the "night vision" capabilities of the cameras. In one non-limiting embodiment, the illuminators may also be activated verbally and/or manually by use of input device 26.

It should be understood that the invention is not limited to the exact construction and method which has been illustrated and described above, but that various changes and modifications may be made without departing from the spirit and the scope of the inventions as is further delineated in the following claims.

What is claimed is:

1. An image acquisition and display system for use with a vehicle comprising:
    a first stereo camera pair which is mounted on a driver-side of said vehicle and which is effective to acquire and transmit first three-dimensional image data;
    a second stereo camera pair which is mounted on a passenger-side of said vehicle and which is effective to acquire and transmit second three-dimensional image data;
    a controller which is communicatively coupled to said first and second stereo camera pairs and which is effective to receive and process said first and second three-dimensional image data and to transmit a signal representing said processed image data; and
    a three-dimensional display assembly which is communicatively coupled to said controller and which is effective to receive said signal and to display said processed image data in a three-dimensional format.

2. The system of claim 1 wherein said first stereo camera pair is operatively disposed within a driver-side mirror shroud and wherein said second stereo camera pair is operatively disposed within a passenger-side mirror shroud.

3. The system of claim 1 further comprising:
    a user input device which is communicatively coupled to said controller and which is effective to receive commands from an operator and to transmit said commands to said controller; and
    wherein said controller is further effective to utilize said commands to operate said first and second stereo camera pairs.

4. The system of claim 3 wherein said commands comprise camera selection commands which are effective to allow a user to selectively acquire and view images from said first stereo camera pair or said second stereo camera pair.

5. The system of claim 4 wherein said commands further comprise zoom commands which allow a user to selectively magnify and minimize images acquired by said first and second stereo camera pairs.

6. The system of claim 3 wherein said user input device comprises a microphone and voice recognition software.

7. The system of claim 3 wherein said user input device comprises a manual input device.

8. The system of claim 1 wherein said first and second stereo camera pairs comprise infrared illuminators.

9. The system of claim 1 wherein said first and second stereo camera pairs are directed in front of said vehicle.

10. The system of claim 1 further comprising:
a first motor assembly on which said first stereo camera pair is mounted and which is effective to selectively rotate and pivot said first stereo camera pair; and
a second motor assembly on which said second stereo camera pair is mounted and which is effective to selectively rotate and pivot said second stereo camera pair.

11. The system of claim 1 wherein said controller comprises image recognition software which is effective to identify objects which are within a field of view of said first and second camera pair based upon image data provided by said objects.

12. An image acquisition and display system for use with a vehicle comprising:
a first stereo camera pair which is mounted on a first side of said vehicle and which selectively receives and provides image data from said first side of said vehicle;
a second stereo camera pair which is mounted on a second side of said vehicle and which selectively receives and provides image data from said second side of said vehicle;
a user input device which is effective to receive and transmit a camera selection command from a user;
a controller which is communicatively coupled to said first and second stereo camera pairs and to said user input device, said controller being effective to receive said camera selection command and to selectively activate said first or said second stereo camera pair based upon said camera selection command, said controller further being effective to receive and process image data received from said activated camera pair and to transmit said processed image data; and
a three-dimensional display assembly which is communicatively coupled to said controller and which is effective to receive said processed image data and to display said processed image data in a three-dimensional format.

13. The image acquisition and display system of claim 12 wherein said display assembly comprises a flat panel display.

14. The image acquisition and display system of claim 12 wherein said display assembly comprises a holographic display.

15. The image acquisition and display system of claim 12 wherein said first stereo camera pair is mounted in a driver-side mirror shroud of said vehicle and said second stereo camera pair is mounted in passenger-side mirror shroud of said vehicle.

16. The image acquisition and display system of claim 12 wherein said controller is further effective to selectively and simultaneously activate a unique one of said first stereo camera pair and a unique one of said second stereo camera pair, and to utilize said activated cameras to acquire images remote from said vehicle with improved resolution.

17. A method for acquiring and displaying images for use with a vehicle and comprising the steps of:
providing a three-dimensional display;
mounting said display within said vehicle;
providing a first and a second stereo camera pair;
mounting said first stereo camera pair on a driver-side of said vehicle;
mounting said second stereo camera pair on a passenger-side of said vehicle;
selectively acquiring images from said first and said second stereo camera pair; and
selectively displaying said acquired images in a three-dimensional format on said display.

18. The method of claim 17 wherein said first and second stereo camera pair include infrared illuminators, said method further comprising the steps of:
monitoring an ambient light level surrounding said vehicle; and
automatically activating said infrared illuminators when said ambient light level falls below a predetermined threshold.

19. The method of claim 17 further comprising the steps of:
providing pattern and image recognition software;
utilizing said pattern and image recognition software to identify said acquired images; and
selectively providing a notification of said identity of said acquired images.

20. The method of claim 19 wherein said notification comprises an audible notification.

* * * * *